US009543571B2

(12) United States Patent
Song et al.

(10) Patent No.: US 9,543,571 B2
(45) Date of Patent: Jan. 10, 2017

(54) PRECURSOR OF A CATHODE ACTIVE MATERIAL FOR A LITHIUM SECONDARY BATTERY, CATHODE ACTIVE MATERIAL, METHOD FOR MANUFACTURING THE CATHODE ACTIVE MATERIAL, AND LITHIUM SECONDARY BATTERY INCLUDING THE CATHODE ACTIVE MATERIAL

(71) Applicant: KOREA ELECTRONICS TECHNOLOGY INSTITUTE, Seongnam-si, Gyeonggi-do (KR)

(72) Inventors: Jun Ho Song, Seongnam-si (KR); Young Jun Kim, Yongin-si (KR); Jeom-Soo Kim, Hwaseong-si (KR); Woo Suk Cho, Seongnam-si (KR); Jae-Hun Kim, Yongin-si (KR); Jun Sung Lee, Suwon-si (KR); Jin Hwa Kim, Seongnam-si (KR); Kyoung Joon Lee, Seoul (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 199 days.

(21) Appl. No.: 14/347,420

(22) PCT Filed: Sep. 18, 2012

(86) PCT No.: PCT/KR2012/007456
§ 371 (c)(1),
(2) Date: Jul. 29, 2014

(87) PCT Pub. No.: WO2013/048047
PCT Pub. Date: Apr. 4, 2013

(65) Prior Publication Data
US 2014/0356712 A1 Dec. 4, 2014

(30) Foreign Application Priority Data

Sep. 26, 2011 (KR) ........................ 10-2011-0097059

(51) Int. Cl.
*H01M 4/131* (2010.01)
*H01M 4/505* (2010.01)
(Continued)

(52) U.S. Cl.
CPC .............. *H01M 4/131* (2013.01); *B82Y 30/00* (2013.01); *C01G 53/00* (2013.01); *C01G 53/006* (2013.01);
(Continued)

(58) Field of Classification Search
CPC ............ H01M 10/052; H01M 10/0525; H01M 2004/021; H01M 2004/028; H01M 4/131; H01M 4/483; H01M 4/505; H01M 4/523; H01M 4/525; H01M 4/54; B82Y 30/00; C01G 53/00; C01G 53/006; C01G 53/44; C01G 53/50; C01P 2002/52; C01P 2004/03; C01P 2004/32; C01P 2004/62; C01P 2004/64; C01P 2006/40; Y02E 60/122; Y02P 70/54
See application file for complete search history.

(56) References Cited

U.S. PATENT DOCUMENTS

2009/0297947 A1    12/2009  Deng et al.
2012/0270107 A1*   10/2012  Toya .................... C01G 53/006
                                                       429/223

FOREIGN PATENT DOCUMENTS

JP    2003346806 A    12/2003
JP    2011116580 A     6/2011
(Continued)

OTHER PUBLICATIONS

Y. Feng, S. Zhao, C. Nan and Y. Lin. Synthesis of the Layered-Spinel Intergrowth Structure Cathode Materials by Co-Precipitation Method, Advanced Materials Research, vols. 105-106, pp. 668-672, available online Apr. 15, 2010.*

(Continued)

Primary Examiner — Carlos Barcena
(74) Attorney, Agent, or Firm — Hauptman Ham, LLP

(57) ABSTRACT

Disclosed are a precursor for a rechargeable lithium battery, a positive active material including the same, a preparation method thereof, and a rechargeable lithium battery including the positive active material. More particularly, the present invention relates to a precursor including a sheet-shaped plate having a thickness of about 1 nm to about 30 nm and that is represented by the following Chemical Formula 1.

$$Ni_xCo_yMn_{1-x-y-z}M_z(OH)_2 \quad \text{[Chemical Formula 1]}$$

In the above Chemical Formula 1,
0<x<1, 0≤y<1, 0.5≤1-x-y-z, and 0≤z<1,
and M is at least one kind of metal selected from the group consisting of Al, Mg, Fe, Cu, Zn, Cr, Ag, Ca, Na, K, In, Ga, Ge, V, Mo, Nb, Si, Ti, and Zr.

2 Claims, 7 Drawing Sheets

(51) Int. Cl.
| | |
|---|---|
| *H01M 10/0525* | (2010.01) |
| *H01M 4/52* | (2010.01) |
| *H01M 4/48* | (2010.01) |
| *H01M 4/54* | (2006.01) |
| *H01M 4/525* | (2010.01) |
| *C01G 53/00* | (2006.01) |
| *H01M 10/052* | (2010.01) |
| *B82Y 30/00* | (2011.01) |
| *H01M 4/02* | (2006.01) |

(52) U.S. Cl.
CPC .............. *C01G 53/44* (2013.01); *C01G 53/50* (2013.01); *H01M 4/483* (2013.01); *H01M 4/505* (2013.01); *H01M 4/523* (2013.01); *H01M 4/525* (2013.01); *H01M 10/052* (2013.01); *C01P 2002/52* (2013.01); *C01P 2004/03* (2013.01); *C01P 2004/32* (2013.01); *C01P 2004/62* (2013.01); *C01P 2004/64* (2013.01); *C01P 2006/40* (2013.01); *H01M 4/54* (2013.01); *H01M 10/0525* (2013.01); *H01M 2004/021* (2013.01); *H01M 2004/028* (2013.01); *Y02E 60/122* (2013.01); *Y02P 70/54* (2015.11)

(56) References Cited

FOREIGN PATENT DOCUMENTS

| JP | 2011116583 A | * | 6/2011 |
| WO | 2010042434 A2 | | 4/2010 |

OTHER PUBLICATIONS

F. Zhou, X. Zhao, A. van Bommel, X. Xia, J. R. Dahn. Comparison of Li[Li1/9Ni1/3Mn5/9]O2, Li[Li1/5Ni1/5Mn3/5]O2, LiNi0.5Mn1.5O4, and LiNi2/3Mn1/3O2 as High Voltage Positive Electrode Materials, Journal of the Electrochemical Society, 158 (2), A187-A191 (2011).*

K. Vediappan, S.-J. Park, H.-S. Kim, C. W. Lee. Preliminary Studies of Mn-Rich Li[Lix(Ni0.3Co0.1Mn0.6)1-x]O2 (x = 0.09, 0.11) as Cathode Active Materials for Lithium Rechargeable Batteries, J. Nanosci. Nanotech. 2011, 11, 865-870.*

International Search Report for PCT/KR2012/007456 mailed on Mar. 26, 2013.

* cited by examiner

PRECURSOR OF A CATHODE ACTIVE MATERIAL FOR A LITHIUM SECONDARY BATTERY, CATHODE ACTIVE MATERIAL, METHOD FOR MANUFACTURING THE CATHODE ACTIVE MATERIAL, AND LITHIUM SECONDARY BATTERY INCLUDING THE CATHODE ACTIVE MATERIAL

CROSS-REFERENCE TO RELATED APPLICATION

This application claims priority to and the benefit of Korean Patent Application No. 10-2011-0097059 filed in the Korean Intellectual Property Office on Sep. 26, 2011, the entire contents of which are incorporated herein by reference.

BACKGROUND OF THE INVENTION (a) Field of the Invention

A positive active material precursor for a rechargeable lithium battery, a positive active material including the same, a preparation method thereof, and a rechargeable lithium battery including the same are disclosed.

(b) Description of the Related Art

As use of small portable electric/electronic devices has widely increased, a new rechargeable battery such as a nickel hydrogen battery or a rechargeable lithium battery has been actively developed. The rechargeable lithium battery uses carbon such as graphite and the like as a negative active material, a metal oxide including lithium as a positive active material, and a non-aqueous solvent as an electrolyte solution. The lithium is a metal having high ionization tendency and may realize a high voltage, and thus is used to develop a battery having high energy density.

The rechargeable lithium batteries mainly use a lithium transition metal oxide including lithium as a positive active material, and specifically, 90% or more use a layered lithium transition metal oxide such as cobalt-based and nickel-based lithium transition metal oxides, a three component-based lithium transition metal oxide in which cobalt, nickel, and manganese coexist, and the like.

However, the layered lithium transition metal oxide that is widely used as a conventional positive active material has reversible capacity of less than or equal to 200 mAhg$^{-1}$ and thus has a limit in terms of energy density. Accordingly, in order to solve the problem of a rechargeable lithium battery due to the limited reversible capacity of a positive electrode, research on a lithium-rich layered oxide (OLO) excessively including lithium instead of the layered lithium transition metal oxide being undertaken.

A positive active material including the lithium-rich layered oxide has a solid solution structure in which a $Li_2MnO_3$ phase is combined with the conventional layered lithium transition metal oxide, and may realize high capacity of greater than or equal to 200 mAhg$^{-1}$ since oxygen is dissociated from the $Li_2MnO_3$, and lithium is extracted therefrom when initially charged at 4.6 V.

However, since the positive active material including the lithium-rich layered oxide is difficult to uniformly prepare during preparation of its precursor and has lower density or non-uniform composition depending on a depth, the positive active material is not sufficiently electrochemically activated, and thus decreases discharge capacity of a battery and aggravates manganese (Mn) elution at high temperature and high voltage, and resultantly, deteriorates battery performance and cycle-life characteristics.

Accordingly, attempts to improve discharge capacity and cycle-life characteristics of the battery have been continuously made by increasing uniformity and density of particles of the lithium-rich layered oxide. The present invention solves this problem and increases discharge capacity of the rechargeable lithium battery by improving uniformity and density of the lithium-rich layered oxide particles.

SUMMARY OF THE INVENTION

One embodiment of the present invention provides a precursor improving density of a positive active material.

Another embodiment of the present invention provides a positive active material for a rechargeable lithium battery realizing discharge capacity of greater than or equal to 220 mAhg$^{-1}$, and a preparation method thereof.

Yet another embodiment of the present invention provides a rechargeable lithium battery including the positive active material and having excellent cycle-life characteristics and high rate capability.

One embodiment of the present invention provides a positive active material precursor for a rechargeable lithium battery including a sheet-shaped plate having a thickness of about 1 nm to about 30 nm and being represented by the following Chemical Formula 1.

$$Ni_xCo_yMn_{1-x-y-z}M_z(OH)_2 \qquad \text{[Chemical Formula 1]}$$

In the above Chemical Formula 1, 0<x<1, 0≤y<1, 0.5≤1-x-y-z, 0≤z<1, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The precursor may be selected from the group consisting of $Ni_{0.2}Co_{0.1}Mn_{0.7}(OH)_2$, $Ni_{0.25}Mn_{0.75}(OH)_2$, $Ni_{0.25}Co_{0.05}Mn_{0.7}(OH)_2$, and $Ni_{0.2}Co_{0.1}Al_{0.05}Mn_{0.65}(OH)_2$.

The precursor may have an average particle size of about 5 μm to about 40 μm.

Another embodiment of the present invention provides a positive active material prepared from the precursor represented by the above Chemical Formula 1, having a primary particle size ranging from about 1 nm to about 500 nm, and being represented by Chemical Formula 2.

$$Li_wNi_xCo_yMn_{1-x-y-z}M_zO_2 \qquad \text{[Chemical Formula 2]}$$

In the above Chemical Formula 2, 1.2≤w≤1.5, 0<x<1, 0≤y<1, 0.5≤1-x-y-z, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The positive active material may be selected from the group consisting of $Li_{1.3}Ni_{0.2}Co_{0.1}Mn_{0.7}O_2$, $Li_{1.3}Ni_{0.25}Mn_{0.75}O_2$, $Li_{1.3}Ni_{0.25}Co_{0.05}Mn_{0.7}O_2$, and $Li_{1.3}Ni_{0.2}Co_{0.1}Al_{0.05}Mn_{0.65}O_2$.

Another embodiment of the present invention provides a method of preparing the positive active material, and the method is provided as follows.

The method includes mixing the precursor represented by the above Chemical Formula 1 and having a sheet-shaped plate thickness of about 1 nm to about 30 nm with a lithium salt in an equivalent ratio of about 1.2 to about 1.7 relative to the lithium salt, and heat-treating the mixture at about 800° C. to about 1100° C. for about 2 hours to about 20 hours to provide a positive active material having a primary particle size of about 1 nm to about 500 nm and being represented by the following Chemical Formula 2.

$$Li_wNi_xCo_yMn_{1-x-y-z}M_zO_2 \qquad \text{[Chemical Formula 2]}$$

In the above Chemical Formula 2, $1.2 \leq w \leq 1.5$, $0 < x < 1$, $0 \leq y < 1$, $0.5 \leq 1-x-y-z$, $0 \leq z < 1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

Yet another embodiment of the present invention provides a rechargeable lithium battery that includes the positive electrode including a positive active material; a negative active material being capable of intercalating/deintercalating lithium ions; a separator interposed between the positive electrode and the negative electrode; and a non-aqueous electrolyte, wherein the rechargeable lithium battery has discharge capacity of greater than or equal to 220 mAhg$^{-1}$.

The precursor may improve density and uniformity of a positive active material, and the positive active material may realize discharge capacity of greater than or equal to 220 mAhg$^{-1}$ when applied to a rechargeable lithium battery. In addition, the rechargeable lithium battery including the positive active material has excellent charge and discharge and high rate capability.

DETAILED DESCRIPTION

Figure 1:
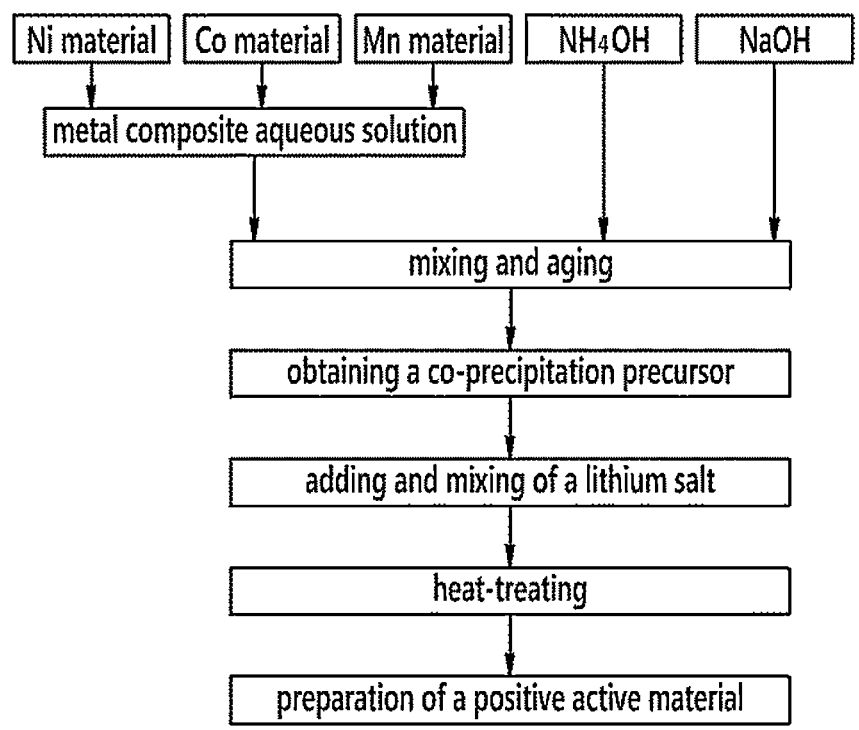
FIG. 1 is a flowchart showing a method of preparing a positive active material.
Figure 2:
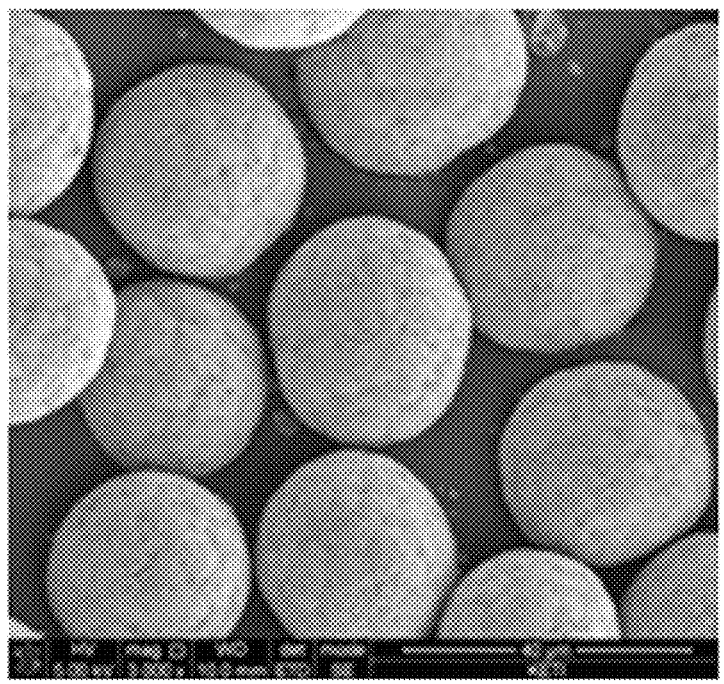
FIG. 2 is a scanning electron microscope (SEM) photograph showing a precursor particle according to Example 1.

The present invention provides a precursor for a rechargeable lithium battery, a positive active material using the same, and a method of preparing the positive active material, and a rechargeable lithium battery using the positive active material.

Hereinafter, embodiments of the present invention are described in detail. However, these embodiments are exemplary, and this disclosure is not limited thereto.

One embodiment of the present invention provides a precursor having a less than or equal to 1 nm to 30 nm-thick sheet-shaped plate and represented by the following Chemical Formula 1.

$$Ni_xCo_yMn_{1-x-y-z}M_z(OH)_2 \qquad \text{[Chemical Formula 1]}$$

In the above Chemical Formula 1, $0 < x < 1$, $0 \leq y < 1$, $0.5 \leq 1-x-y-z$, $0 \leq z < 1$, and M is at least one kind of metal selected from the group consisting of Al, Mg, Fe, Cu, Zn, Cr, Ag, Ca, Na, K, In, Ga, Ge, V, Mo, Nb, Si, Ti, and Zr.

The precursor may include nickel, cobalt, and manganese, as well as other metals. Herein, the metals may be a transition metal, a rare earth element, and the like, and for example, at least one selected from the group consisting of Al, Mg, Fe, Cu, Zn, Cr, Ag, Ca, Na, K, In, Ga, Ge, V, Mo, Nb, Si, Ti, and Zr. In addition, the manganese may be included in an amount of greater than or equal to 0.5 mol based on the total moles of all the metals in a metal composite oxide represented by the above Chemical Formula 1, and the nickel, cobalt, and manganese may be included in a ratio appropriately adjusted depending on a purpose.

For example, the precursor represented by the above Chemical Formula 1 may be one selected from $Ni_{0.2}Co_{0.1}Mn_{0.7}(OH)_2$, $Ni_{0.25}Mn_{0.75}(OH)_2$, $Ni_{0.25}Co_{0.05}Mn_{0.7}(OH)_2$, and $Ni_{0.2}Co_{0.1}Al_{0.05}Mn_{0.65}(OH)_2$.

The precursor has a structure in which sheet-shaped plates are randomly arranged, for example, the sheet-shaped plates having a structure that thin plates are laminated in a plane direction are randomly arranged. Herein, the sheet-shaped plate may be about 1 to about 30 nm thick, for example, about 10 to about 20 nm thick. When the sheet-shaped plate in the precursor has a thickness of about 1 to about 30 nm, the positive active material prepared from the precursor has a sufficiently small primary particle and thus, high density and uniformity and resultantly, may improve discharge capacity of a rechargeable battery.

According to one embodiment of the present invention, the precursor may be prepared in a method of adding a raw nickel material including a nickel sulfate salt, a nickel nitrate salt, a nickel chloride salt, a nickel acetate salt, and the like, a raw cobalt material including a cobalt sulfate salt, a cobalt nitrate salt, a cobalt chloride salt, a cobalt acetate salt, and the like, and a raw manganese material including a manganese sulfate salt, a manganese nitrate salt, a manganese chloride salt, a manganese acetate salt, and the like to an aqueous solution in a co-precipitation reactor; adding sodium hydroxide and an ammonia solution to the mixture to maintain its pH at about 10 to about 12 and agitating the obtained mixture for about 5 to about 20 hours at a speed of about 1000 to about 3000 rpm; and co-precipitating a metal composite oxide and then filtering and washing it. Herein, sheet-shaped plates present in the prepared precursor have a thickness of about 1 to about 30 nm. In the preparing method, the thickness of the sheet-shaped plates of the precursor may be adjusted by controlling several factors such as shape of the co-precipitation reactor, a ratio between diameter and depth of the co-precipitation reactor, an agitation speed (rpm), pH of a reaction solution, and the like.

In the method of preparing the precursor for a rechargeable lithium battery, primary particle thickness of the precursor may be controlled by additionally adding sodium carbonate in a predetermined amount to the sodium hydroxide. When the sodium carbonate in a predetermined amount is added, uniformity and sphericality of the co-precipitation precursor may be increased.

The precursor obtained from the co-precipitation reaction may have an average particle size of about 5 to about 40 μm. When the precursor has an average particle size of about 5 to about 40 μm, a high-capacity rechargeable battery may be realized by providing a positive active material having high density and uniformity.

Another embodiment of the present invention provides a positive active material having a primary particle size of about 1 nm to about 500 nm and represented by the following Chemical Formula 2 by using the precursor including about 1 nm to about 30 nm-thick sheet-shaped plates.

 [Chemical Formula 2]

In the above Chemical Formula 2, 1.2≤w≤1.5, 0<x<1, 0≤y<1, 0.5≤1-x-y-z, and M is at least one kind of a metal selected from the group consisting of Al, Mg, Fe, Cu, Zn, Cr, Ag, Ca, Na, K, In, Ga, Ge, V, Mo, Nb, Si, Ti, and Zr.

The positive active material represented by the above Chemical Formula 2 includes lithium in a large amount of greater than or equal to about 1.2 mol to less than or equal to about 1.5 mol, and manganese in an amount of greater than or equal to 0.5 mol based on the total moles of the metals except for the lithium. On the other hand, the manganese may be partly substituted with other elements in order to improve structural stability and enhance cycle-life characteristics. The substituted metal may be at least one selected from the group consisting of a transition metal, a rare earth element, or the like, for example, the group consisting of Al, Mg, Fe, Cu, Zn, Cr, Ag, Ca, Na, K, In, Ga, Ge, V, Mo, Nb, Si, Ti, and Zr.

The positive active material represented by the above Chemical Formula 2 is a lithium-rich layered metal composite oxide having a layered structure, and when a battery is charged at about 4.5 to 5.0 V, $Li_2MnO_3$ is electrochemically activated and may realize discharge capacity of greater than or equal to 220 $mAhg^{-1}$. Herein, the lithium metal composite oxide has a plateau region around about 4.6 to about 5 V, and generates oxygen when charged at a high voltage of greater than or equal to 4.6 V based on a positive electrode potential. The charging may be performed in a conventional method in the present art without a particular limit.

The positive active material may be obtained by using the precursor represented by the above Chemical Formula 1 specifically in a method of mixing the precursor with a lithium salt such as lithium hydroxide, lithium carbonate, lithium oxide, lithium acetate, and the like in a weight ratio of about 1.2 to about 1.7; and heat-treating the mixture at about 800° C. to about 1100° C. for about 2 to about 20 hours.

Still another embodiment of the present invention provides a rechargeable lithium battery including a positive electrode including a positive active material represented by the above Chemical Formula 2, a negative electrode including a negative active material being capable of intercalating/deintercalating lithium ions, a separator interposed between the positive and negative electrodes, and a non-aqueous electrolyte, and having discharge capacity of greater than or equal to 220 $mAhg^{-1}$.

The rechargeable lithium battery may have a shape such as a coin, a button, a sheet, a cylinder, a prism, and the like. The rechargeable lithium battery may be prepared in a conventional method, which will not be illustrated in detail. In addition, manufacture of the positive electrode and constitution of the rechargeable lithium battery may be briefly illustrated, but is not limited thereto.

The positive electrode may be prepared by dissolving a positive active material represented by the above Chemical Formula 2 along with a conductive material, a binder, and other additives, for example, at least one additive selected from a filler, a dispersing agent, an ion conductive material, a pressure enhancer, and the like in an appropriate organic solvent to prepare a slurry or paste, coating the slurry or paste on a current collector, and drying and compressing the coated slurry or paste.

The positive electrode includes a current collector and a positive active material layer represented by the above Chemical Formula 2, and the positive active material layer may be formed by using a positive active material having a coating layer on the surface or mixing the positive active material with a compound having a coating layer. The coating layer may be formed by using a coating element compound such as an oxide of Mg, Al, Co, K, Na, Ca, Si, Ti, V, Sn, Ge, Ga, B, As, or Zr, or a mixture thereof.

The binder may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material improves conductivity of an electrode, any electrically conductive material may be used as the conductive material unless it causes a chemical change, and examples thereof may be one or more of natural graphite, artificial graphite, carbon black, acetylene black, ketjen black, a carbon fiber, a metal powder, metal fiber, and the like of copper, nickel, aluminum, silver, and the like, and a conductive material of a polyphenylene derivative and the like.

A current collector of the positive electrode may be a foil, a sheet, and the like of copper, nickel, stainless steel, aluminum and the like, or a carbon fiber, and the like.

The negative electrode includes a current collector and a negative active material layer formed on the current collector.

As for the negative active material, one or two kinds of a composite oxide and the like of a carbon material such as graphite and the like or a transition metal capable of reversibly intercalating/deintercalating lithium ions may be used. Other than these materials, silicon, tin, and the like may be used as the negative electrode material.

The negative active material layer includes a binder, and may optionally include a conductive material.

The binder improves binding properties of negative active material particles with one another and with a current collector, and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

Examples of the conductive material may be a carbon-based material of natural graphite, artificial graphite, carbon black, acetylene black, ketjen black, a carbon fiber, and the like; a metal-based material such as a metal powder or a metal fiber and the like of copper, nickel, aluminum, silver, and the like; a conductive polymer such as a polyphenylene derivative and the like; or a mixture thereof.

The negative current collector may be a copper foil, a nickel foil, a stainless steel foil, a titanium foil, a nickel foam, a copper foam, a polymer substrate coated with a conductive metal, or a combination thereof.

The electrolyte includes a non-aqueous organic solvent and a lithium salt.

The non-aqueous organic solvent may be a carbonate-based, ester-based, ether-based, ketone-based, alcohol-based, or aprotic solvent. The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may be methyl acetate, ethyl acetate, n-propyl acetate, dimethyl acetate, methyl propionate, ethyl propionate, γ butyrolactone, decanolide, valerolactone, mevalonolactone, caprolactone, and the like. The ether-based solvent may be dibutyl ether, tetraglyme, diglyme, dimethoxyethane, 2-methyltetrahydrofuran, tetrahydrofuran, and the like, and the ketone-based solvent may be cyclohexanone and the like. The alcohol-based solvent may be ethanol, isopropyl alcohol, and the like, and the aprotic solvent may be nitriles of R—CN (R is a C2 to C20 linear, branched or cyclic structured hydrocarbon group, and may include a double bond aromatic ring or an ether bond) and the like, amides of dimethylformamide and the like, dioxolanes such as 1,3-dioxolane and the like, or sulfolanes and the like.

The non-aqueous organic solvent may be used singularly or in a mixture, and when the organic solvent is used in a mixture, the mixture ratio may be controlled in accordance with a desirable battery performance.

A lithium salt dissolved in such a solvent may include $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, LiBOB (lithium bis(oxalato)borate), lower aliphatic carbonic acid lithium, chloroborane lithium, imides of $LiN(CF_3SO_2)$, $Li(C_2F_5SO_2)$, $LiN(CF_3SO_2)_2$, $LiN(C_2F_5SO_2)_2$, $LiN(CF_3SO_2)(C_4F_9SO_2)$, and the like. These lithium salts may be used alone or combined in an electrolyte solution and the like unless they damage effects of the present invention. In particular, $LiPF_6$ may be included. In addition, carbon tetrachloride, trifluorochloroethylene, or a phosphate salt and the like including phosphorus may be included in the electrolyte solution so as to make the electrolyte solution nonflammable.

The separator may be polyethylene, polypropylene, polyvinylidene fluoride, or a multi-layer of the above, and a mixed multi-layer such as a polyethylene/polypropylene double-layered separator, a polyethylene/polypropylene/polyethylene triple-layered separator, a polypropylene/polyethylene/polypropylene triple-layered separator, and the like may be used.

Hereinafter, examples of the present invention and comparative examples are described. These examples, however, are not in any sense to be interpreted as limiting the scope of the invention.

EXAMPLE

Example 1

Figure 3:
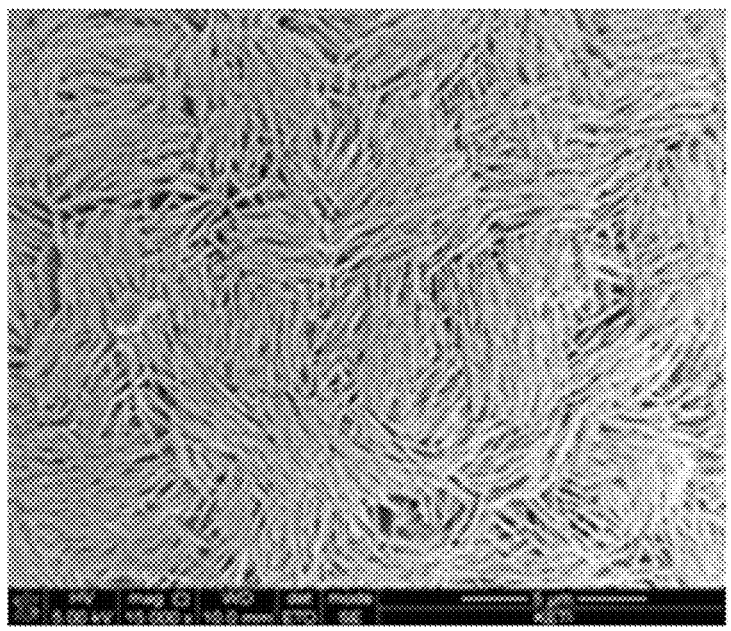
FIG. 3 shows a sheet-shaped plate consisting of primary particles of the precursor.
Figure 4:
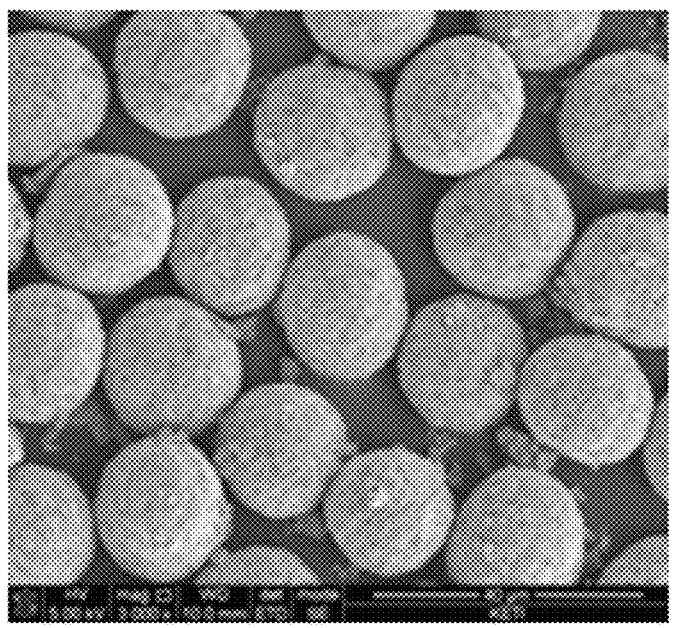
FIG. 4 is a SEM photograph showing a precursor particle according to a comparative example.

A 1 M metal composite aqueous solution was prepared by mixing a nickel sulfate salt, a cobalt sulfate salt, and a manganese sulfate salt in a ratio of 0.20:0.10:0.70 and injected in a co-precipitation reactor at a speed of 10 mL/min. Simultaneously, while a 1 M ammonia solution was injected thereto at a speed of 5 mL/min, pH of the mixed solution was adjusted to be 11.0 by controlling the amount of sodium hydroxide through a pH controller. Herein, sodium carbonate in a predetermined amount was added to the sodium hydroxide to control thickness of a primary particle. The mixed solution was agitated at 1000 rpm by using a particularly-designed co-precipitation reactor to increase uniformity and sphericity degree of a produced co-precipitation precursor and aged for 10 hours, preparing a spherical shape precursor. As shown in FIG. 3, a sheet-shaped plate in the spherical shape precursor of Example 1 had a thickness of 25 nm.

This precursor was washed with ultrapure water at greater than or equal to 30° 3 until it had pH of less than or equal to 8 and dried at 80° C. for 12 hours. Subsequently, lithium carbonate was dry-mixed with the dried co-precipitation precursor in an equivalent ratio of 1.3 relative to the co-precipitation precursor, and the mixture was heat-treated at 900° C. for 10 hours, preparing a positive active material according to Example 1. The positive active material had a primary particle size of 400 nm and was allocated to have an average particle size of 25 μm.

Manufacture of Rechargeable Lithium Battery Cell 90 wt % of the positive active material was dissolved along with 5 wt % of acetylene black as a conductive material, 5 wt % of polyvinylidene fluoride (PVdF) as a binder in N-methyl-2-pyrrolidone (NMP), preparing a slurry. This slurry was coated on a 20 μm-thick aluminum foil, dried and compressed with a press, and then dried under vacuum at 120° C. for 16 hours, preparing a disk-shaped electrode having a diameter of 16 mm. As a counter electrode, a lithium metal punched to have a diameter of 16 mm was used, and a PP film was used as a separation membrane. An electrolyte solution was a 1 M $LiPF_6$ solution of ethylene carbonate (EC)/dimethylether (DME) mixed in a ratio of 1:1 (v/v). The electrolyte solution was impregnated into the separation membrane, this separation membrane was inserted between a working electrode and the counter electrode, and a CR2032 SUS case was used to manufacture a rechargeable lithium battery cell.

Example 2

A positive active material and a rechargeable battery cell were prepared according to the same method as Example 1, except for agitating the metal composite aqueous solution in the co-precipitation reactor at 1200 rpm. On the other hand, a sheet-shaped plate in a precursor according to Example 2 had a thickness of 30 nm, and the positive active material obtained by using the precursor had a primary particle size of 500 nm.

Comparative Example 1

A positive active material and a rechargeable battery cell were prepared according to the same method as Example 1, except for adding sodium carbonate during preparation of the co-precipitation precursor. On the other hand, a sheet-shaped plate in the precursor of Comparative Example 1 was 50 nm, and the positive active material obtained by using the precursor had a primary particle size of 750 nm.

Comparative Example 2

A positive active material and a rechargeable battery cell were prepared according to the same method as Example 1, except for aging the mixture for 5 hours without adding sodium carbonate during preparation of the co-precipitation precursor. On the other hand, a sheet-shaped plate in a precursor according to Comparative Example 2 had a thickness of 70 nm, and the positive active material obtained by using the precursor had a primary particle size of 1000 nm.

TABLE 1

|  | Plate thickness of precursor (nm) | Primary particle size of positive active material (nm) | 0.1 C discharge capacity/ mAhg$^{-1}$ | 1.0 C discharge capacity/ mAhg$^{-1}$ |
|---|---|---|---|---|
| Example 1 | 25 | 400 | 227 | 152 |
| Example 2 | 30 | 500 | 221 | 147 |
| Comparative Example 1 | 50 | 750 | 143 | 67 |
| Comparative Example 2 | 70 | 1000 | 80 | 17 |

Experimental Example 1

Scanning Electron Microscope (SEM)

SEM photographs of the co-precipitation precursors of Example 1 and Comparative Example 1 and 2 were taken by using JSM-7000F (Jeol Ltd.) equipment. Primary and secondary particle images of the co-precipitation precursors according to Example 1 and Comparative Examples 1 and 2 are respectively provided in FIGS. 2 to 6 and 3 to 7.

As shown in FIG. 3, the spherical shape precursor of Example 1 (FIG. 2) had a structure in which sheet-shaped plates laminated in a plane direction were randomly arranged, and the sheet-shaped plate had a thickness of 25 nm.

Figure 5:
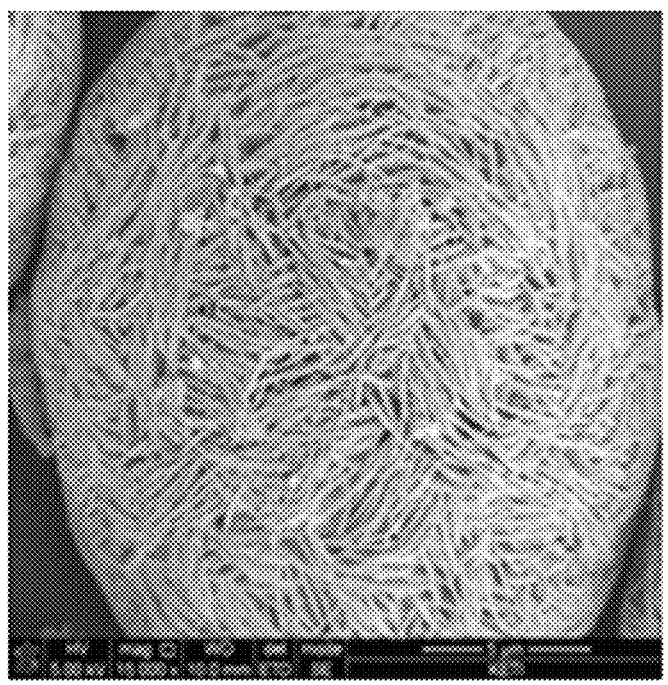
FIG. 5 shows a sheet-shaped plate consisting of primary particles of the precursor.
Figure 6:
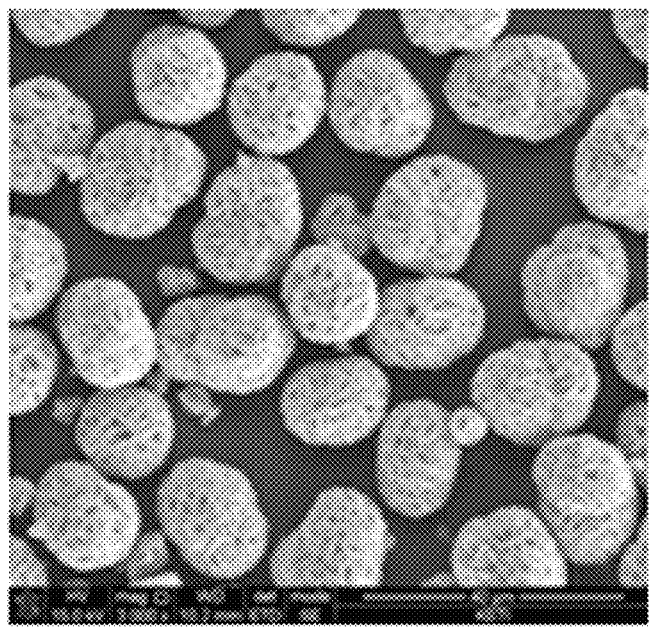
FIG. 6 is a SEM photograph showing a precursor particle according to a comparative example.
Figure 7:
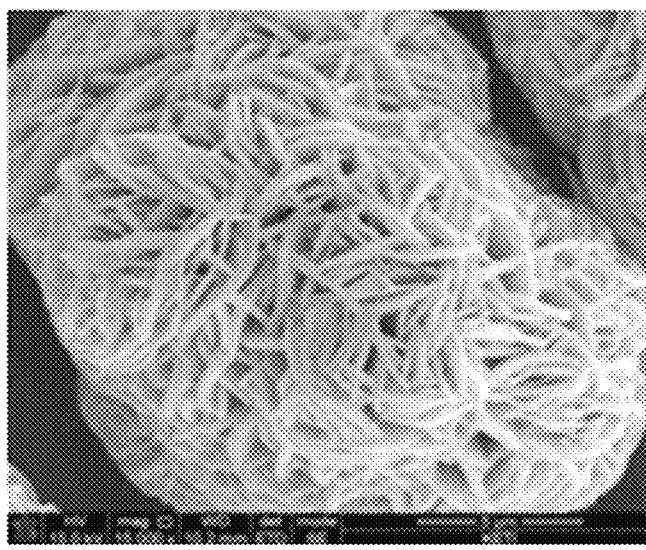
FIG. 7 shows a sheet-shaped plate consisting of primary particles of the precursor.

FIGS. 5 and 7 show primary particles of the co-precipitation precursors according to Comparative Examples 1 and 2, and the sheet-shaped plates respectively had a thickness of 50 nm and 70 nm.

The sheet-shaped plates of the precursors according to Comparative Examples 1 and 2 were thicker than the plate of the precursor according to Example 1. On the other hand, the positive active material of Example 1 showed a much denser structure than the positive active materials of Comparative Examples 1 and 2. Densities of the positive active materials were examined by evaluating charge and discharge characteristics of the rechargeable lithium battery cells.

Experimental Example 2

Charge and Discharge Characteristics of Battery Cell

C-rate characteristics of the battery cells according to Example 1 and Comparative Examples 1 and 2 were evaluated by using TOSCAT 3000 (Toyo System Co.) equipment, and charging and discharging the battery cells at room temperature of 25° C. at a potential of 2.0 to 4.6 V under various current density conditions.

Figure 8:
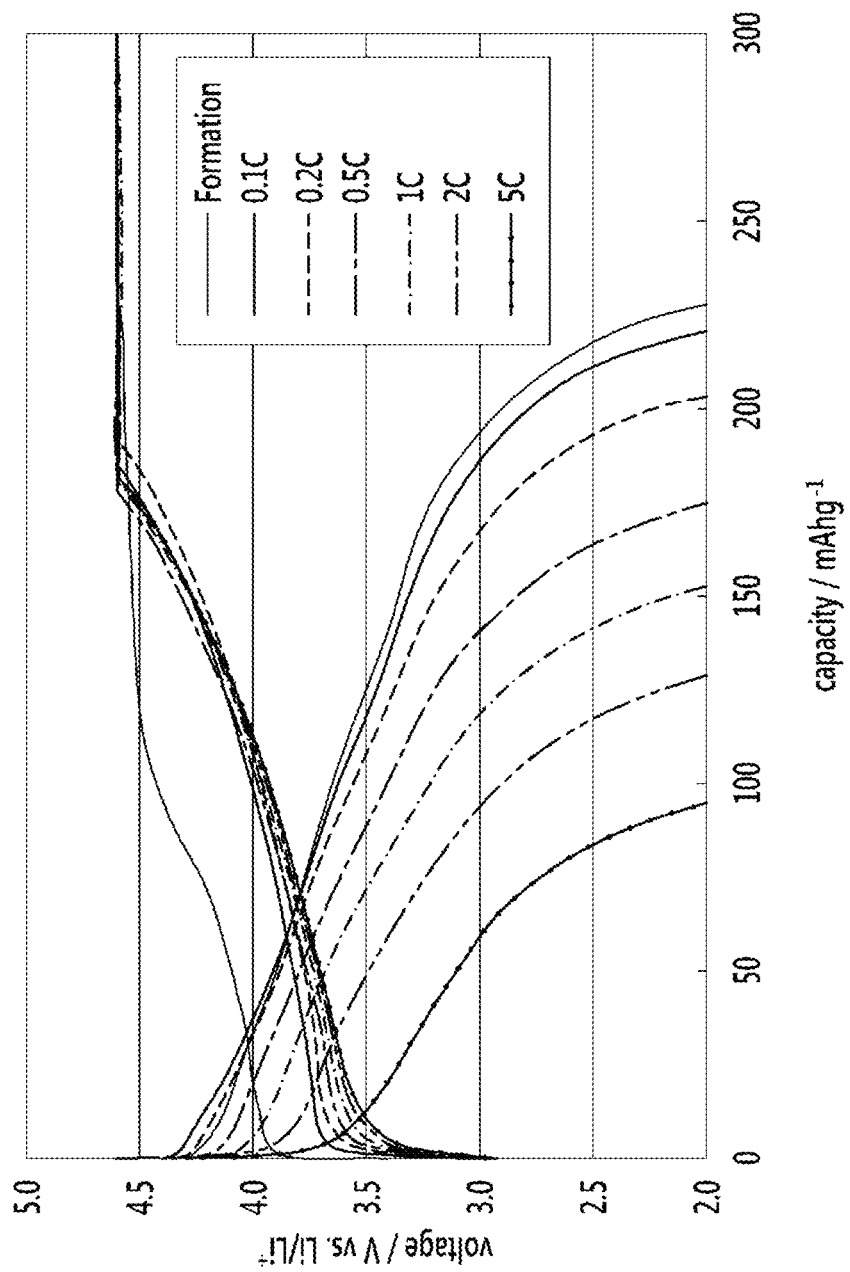
FIG. 8 is a graph showing charge and discharge characteristics of a rechargeable lithium battery according to one embodiment of the present invention.
Figure 9:
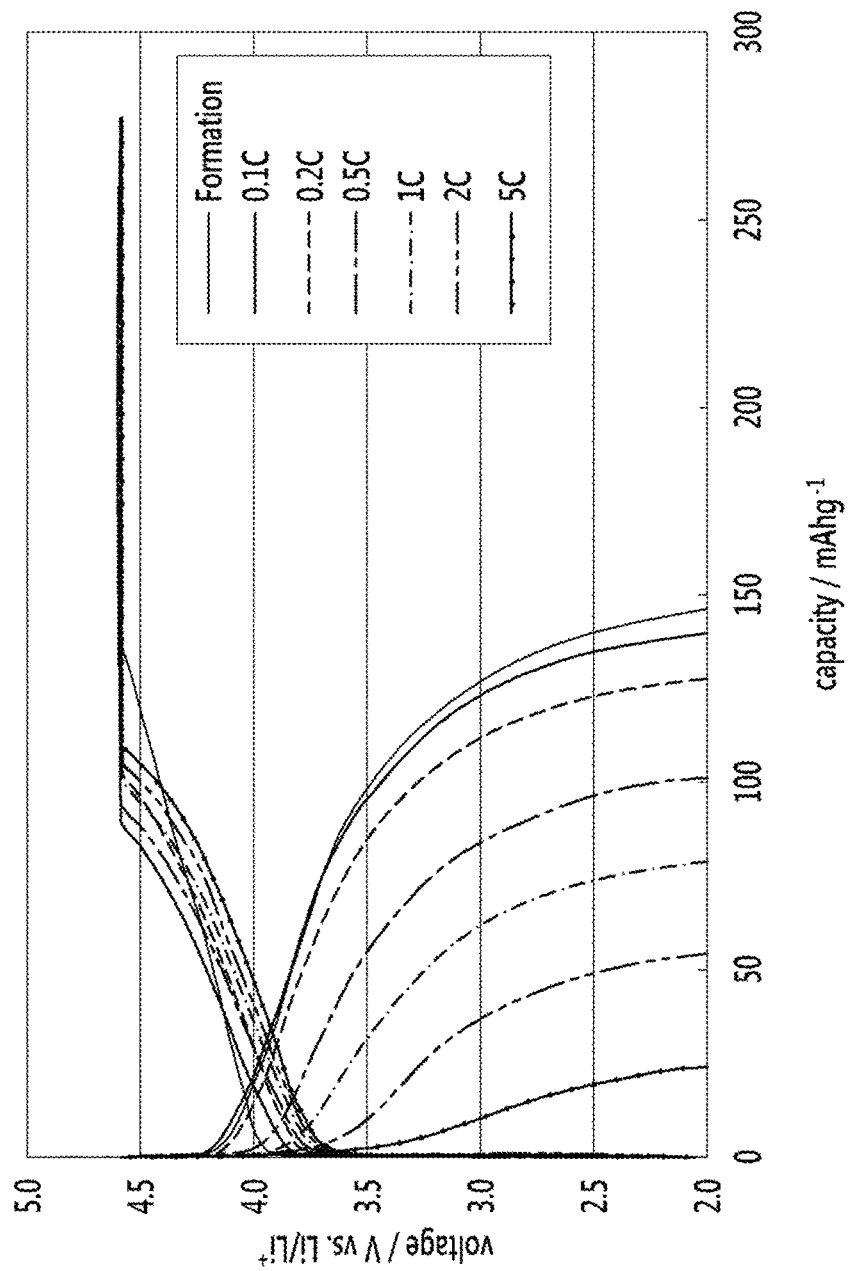
FIG. 9 is a graph showing charge and discharge characteristics of a rechargeable lithium battery according to a comparative example of the present invention.
Figure 10:
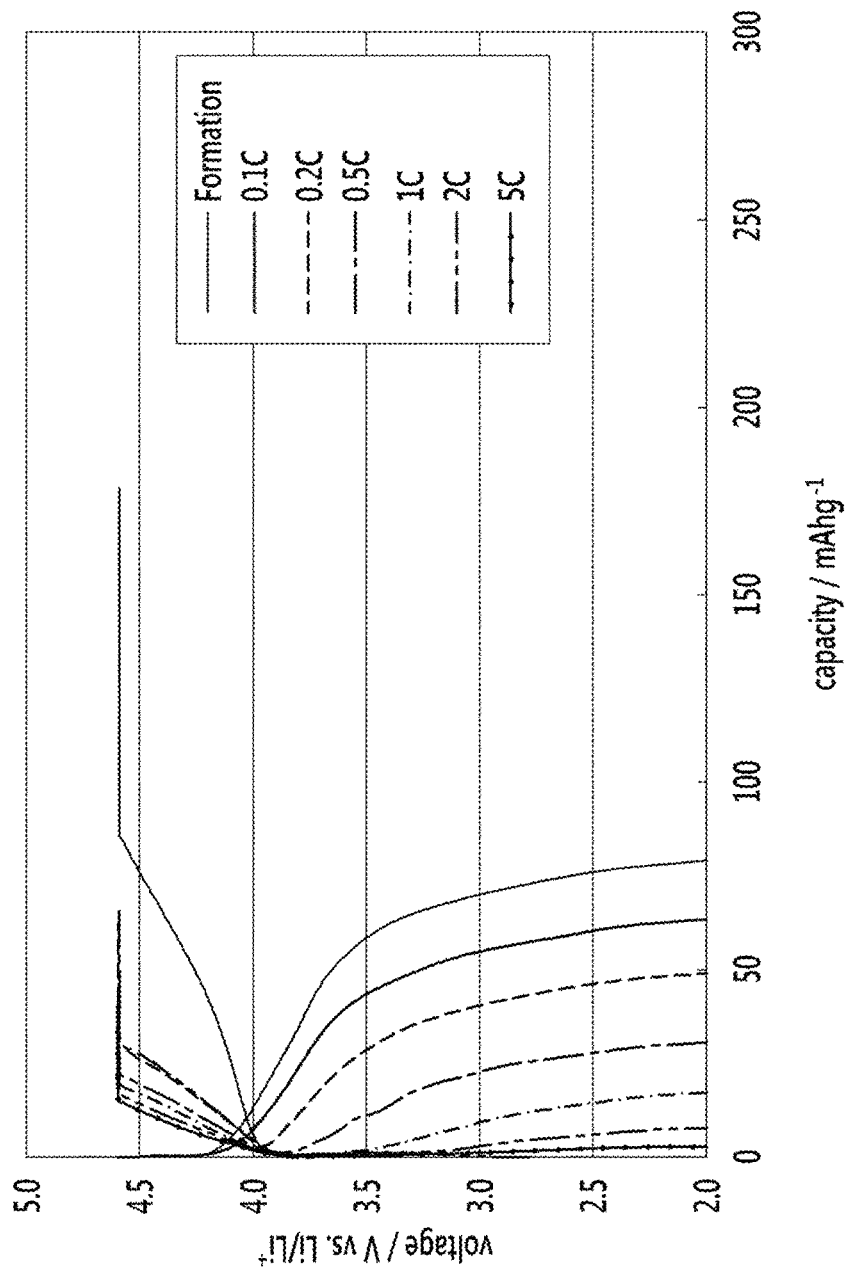
FIG. 10 is a graph showing charge and discharge characteristics of a rechargeable lithium battery according to a comparative example of the present invention.

Herein, FIGS. 8 to 10 are graphs respectively showing high rate characteristics of the battery cells using each positive active material of Example 1 and Comparative Examples 1 and 2 when charged and discharged at room temperature.

As shown in FIG. 8, the positive active material of Example 1 showed discharge capacity of 227 mAhg$^{-1}$ compared with the positive active materials of Comparative Examples 1 and 2 when measured at 0.1 C and room temperature. In addition, the positive active material of Example 2 had discharge capacity of 211 mAhg$^{-1}$ at room temperature.

On the other hand, the positive active materials of Comparative Examples 1 and 2 shown in FIGS. 9 and 10 respectively had only discharge capacity of 143 mAhg$^{-1}$ and 80 mAhg$^{-1}$ at 0.1 C and room temperature. Accordingly, the positive active materials according to Examples 1 and 2 had a primary particle size of less than or equal to 500 nm by controlling a sheet-shaped primary particle of a precursor to be less than or equal to 30 nm, and thus had high density, and could realize discharge capacity of greater than or equal to 220 mAhg$^{-1}$ at room temperature when used for a rechargeable lithium battery cell.

Exemplary embodiments of the present invention illustrated in the specification and drawings are provided to facilitate understanding, but do not limit the range of the present invention. Other exemplary variations based on a technology of the present invention other than the exemplary embodiments are clearly understood and accepted by those who have ordinary skill in this art to the present invention.

What is claimed is:

1. A positive active material precursor for a rechargeable lithium battery comprising a sheet-shaped plate having a thickness of 1 nm to 30 nm, and
being represented by the following Chemical Formula 1:

$$Ni_xCo_yMn_{1-x-y-z}M_z(OH)_2 \qquad \text{[Chemical Formula 1]}$$

wherein, in the above Chemical Formula 1,
$0<x<1$, $0<y<1$, $0.65 \leq 1-x-y-z$, and $0 \leq z<1$, and
M is at least one kind of metal selected from the group consisting of Al, Mg, Fe, Cu, Zn, Cr, Ag, Ca, Na, K, In, Ga, Ge, V, Mo, Nb, Si, Ti, and Zr, and
wherein the positive active material precursor has an average particle size of 25 μm to 40 μm.

2. The positive active material precursor for a rechargeable lithium battery of claim 1, wherein the positive active material precursor for a rechargeable lithium battery is selected from the group consisting of $Ni_{0.2}Co_{0.1}Mn_{0.7}(OH)_2$, $Ni_{0.25}Co_{0.05}Mn_{0.7}(OH)_2$, and $Ni_{0.2}Co_{0.1}Al_{0.05}Mn_{0.65}(OH)_2$.

* * * * *